US012607119B2

(12) United States Patent
Ito et al.

(10) Patent No.: US 12,607,119 B2
(45) Date of Patent: Apr. 21, 2026

(54) IN-SITU STRESS MEASUREMENT METHOD

(71) Applicants: Japan Petroleum Exploration Co., Ltd., Tokyo (JP); Tohoku University, Sendai (JP)

(72) Inventors: Takatoshi Ito, Sendai (JP); Tetsuya Tamagawa, Chiba (JP)

(73) Assignees: JAPAN PETROLEUM EXPLORATION CO., LTD., Tokyo (JP); TOHOKU UNIVERSITY, Miyagi (JP)

( * ) Notice: Subject to any disclaimer, the term of this patent is extended or adjusted under 35 U.S.C. 154(b) by 426 days.

(21) Appl. No.: 18/016,708

(22) PCT Filed: Jul. 14, 2021

(86) PCT No.: PCT/JP2021/026449
§ 371 (c)(1),
(2) Date: Jan. 18, 2023

(87) PCT Pub. No.: WO2022/019191
PCT Pub. Date: Jan. 27, 2022

(65) Prior Publication Data
US 2023/0349288 A1 Nov. 2, 2023

(30) Foreign Application Priority Data
Jul. 20, 2020 (JP) ................................. 2020-123970

(51) Int. Cl.
*E21B 49/02* (2006.01)
*G01B 11/10* (2006.01)
(52) U.S. Cl.
CPC ............ *E21B 49/02* (2013.01); *G01B 11/105* (2013.01)
(58) Field of Classification Search
CPC ....... G06F 3/061; G06F 3/0659; G06F 3/0679
See application file for complete search history.

(56) References Cited

U.S. PATENT DOCUMENTS 4,491,022 A * 1/1985 de la Cruz .............. E02D 1/022
73/783
4,665,984 A 5/1987 Hayashi et al.
(Continued)

FOREIGN PATENT DOCUMENTS

CA 3048154 A1 * 7/2018 ........... E21B 49/006
JP S62-50591 A 3/1987
(Continued)

OTHER PUBLICATIONS

Ge, et al.: "A new approach for measuring the in situ 3D rock stress tensor in drilled borehole" (In-situ Rock Stress, Lu, Li, Kjlorholt & Dahle (eds), copyright 2006 Taylor & France Group, London, ISBN 0-415-40163-1) (Year: 2006).*
(Continued)

*Primary Examiner* — Catherine T. Rastovski
*Assistant Examiner* — Toni D Sauncy
(74) *Attorney, Agent, or Firm* — Panitch Schwarze Belisario & Nadel LLP

(57) ABSTRACT

A cylindrical side-wall core is acquired from an inner circumferential surface of a well at a predetermined depth from a ground surface. First, second and third measurement cross sections spaced apart in a longitudinal direction of the core are set. In each cross section, the length of the maximum diameter of the cross section where the amount of distortion relative to the diameter of a standard circle is largest and the length of the minimum diameter where the amount of distortion relative to the diameter of the standard circle is smallest are measured. Six independent components among stress tensors for defining three-dimensional stress elements are obtained using an equation representing a difference between maximum and minimum stresses acting on the side-wall core along each cross section and another equation representing the angle between the well excavation
(Continued)

direction and the action direction of the maximum stress on each cross section.

3 Claims, 6 Drawing Sheets

(56) References Cited

U.S. PATENT DOCUMENTS

| | | | | |
|---|---|---|---|---|
| 5,253,719 | A * | 10/1993 | Blauch | E21B 49/005 |
| | | | | 175/58 |
| 5,511,615 | A * | 4/1996 | Rhett | E21B 49/006 |
| | | | | 166/308.1 |
| 9,303,508 | B2 * | 4/2016 | Ramakrishnan | E21B 49/006 |
| 9,897,428 | B2 * | 2/2018 | Hieb | G01B 5/10 |
| 2009/0070042 | A1 * | 3/2009 | Birchwood | G01V 1/50 |
| | | | | 702/11 |
| 2009/0133932 | A1 * | 5/2009 | Church | E21B 49/06 |
| | | | | 175/44 |
| 2010/0250214 | A1 * | 9/2010 | Prioul | G01V 1/48 |
| | | | | 703/2 |
| 2010/0282516 | A1 * | 11/2010 | Buchanan | E21B 49/06 |
| | | | | 175/58 |

| | | | | |
|---|---|---|---|---|
| 2012/0272743 | A1 * | 11/2012 | Sun | G01N 29/07 |
| | | | | 73/784 |
| 2015/0055438 | A1 * | 2/2015 | Yan | G01V 1/282 |
| | | | | 367/73 |
| 2020/0149984 | A1 | 5/2020 | Ito et al. | |

FOREIGN PATENT DOCUMENTS

| | | | |
|---|---|---|---|
| JP | H07301574 | A | 11/1995 |
| JP | 2004117319 | A | 4/2004 |
| JP | 2017025617 | A * | 2/2017 |
| JP | 6332653 | B1 | 5/2018 |
| JP | 2018-105788 | A | 7/2018 |
| JP | 20200063552 | A | 4/2020 |

OTHER PUBLICATIONS

English Translation for JP_2017025617 (Year: 2017).*
Notice of Allowance issued on Apr. 13, 2021, in Japanese Patent Application No. 2020-123970, with English translation.
International Search Report issued on Aug. 10, 2021, in correponding PCT Application No. PCT/JP2021/026449.

* cited by examiner

IN-SITU STRESS MEASUREMENT METHOD

CROSS-REFERENCE TO RELATED APPLICATIONS

This application is a Section 371 of International Application No. PCT/JP2021/026449, filed Jul. 14, 2021, which was published in the Japanese language on Jan. 27, 2022, under International Publication No. WO 2022/019191 A1, which claims priority under 35 U.S.C. § 119 (b) to Japanese Application No. 2020-123970, filed Jul. 20, 2020, the disclosures of all of which are incorporated herein by reference.

TECHNICAL FIELD

The present invention relates to a method for measuring three-dimensional stress elements acting on the situs of the ground configuring the earth's crust, that is, an in-situ stress measurement method.

BACKGROUND ART

In the mining of underground resources such as petroleum, natural gas, and the like, first, petroleum geological conditions are evaluated by remote sensing, aerial photographic interpretation, or the like, subsequently, the geological structure of the underground is inferred by comprehensively analyzing a plurality of pieces of data obtained by geological and geochemical investigations, seismic exploration, and the like, and a place in which a large amount of petroleum is highly likely to be found is selected. Once a candidate site of a petroleum gas well is selected, an exploratory well is excavated in the site, and the status of the geological layer is inferred. When a geological layer in which petroleum is expected to be found in the ground in which the exploratory well has been excavated is found, the core of rock is acquired from the ground including the geological layer, the type, mineral texture, and the like of the rock are inferred by observing the core, and, furthermore, the properties of the rock included in the geological layer such as porosity, penetration rate, or the like are investigated in detail.

For inference of the status of the ground of the candidate site, it is also important to analyze the mechanical behaviors of the ground such as consolidation, stresses in the ground, shear, earth pressure, and the like. When the stress state of the ground in which the petroleum gas well is excavated is evaluated on the basis of the analysis results and the fact that the petroleum gas well can be robustly maintained for a long period of time can be confirmed, it is possible to stably produce petroleum from the petroleum gas well.

The evaluation of the stress environment of the ground is carried, out on exploratory wells, and is also carried out on petroleum gas wells intended for the continuous production of petroleum. When three-direction stresses can be accurately measured in such petroleum gas wells, it is possible to precisely infer the dynamic environment around the tectonic ground, and thus it is possible to effectively carry out fracturing on the tectonic ground. As a result, it is possible to efficiently acquire petroleum through fractures.

Patent Document 1 below discloses an in-situ stress measurement method in which, in a well excavated in the ground, the ground located at a predetermined depth from the ground surface is hollowed out in the excavation direction of the well to acquire a cylindrical boring core, the ground located at the same depth is hollowed out from the inner circumferential surface of the well in a direction different from the excavation direction to acquire a cylindrical side-wall core, and the maximum horizontal stress and the minimum horizontal stress acting on the ground at the depth from which these cores have been acquired are obtained on the basis of the shape of the measurement cross section of the boring core and the shape of the side-wall core.

CITATION LIST

Patent Document

Patent Document 1: Japanese Patent No. 6332653

SUMMARY OF INVENTION

Technical Problem

By the way, the in-situ stress measurement method disclosed in Patent Document 1 is intended for wells excavated in the vertical direction or a direction that can be regarded as substantially vertical, and, when this method is carried out on wells excavated in a direction clearly inclined with respect to the vertical direction, there is a possibility that the accuracy of the measured values is not guaranteed.

The present invention is applicable not only to wells excavated in the vertical direction but also to wells excavated in a direction inclined with respect to the vertical direction and provides a method capable of precisely measuring three-dimensional stress elements acting on the ground at a predetermined depth in the ground configuring the earth's crust.

Solution to Problem

An in-situ stress measurement method according to the present invention is adopted for measuring three-dimensional stress elements acting on a ground forming an earth's crust, the method includes: acquiring at least one cylindrical side-wall core by hollowing out the ground in a well, which is located at a predetermined depth from the earth's surface, from an inner circumferential surface of the well in a direction different from an excavation direction of the well; setting at least first, second and third measurement cross sections in the side-wall core, wherein the first, second and third measurement cross sections are separated from each other in a longitudinal direction of the side-wall core; measuring, in each of the shape of the first, second and third measurement cross sections, the length of the maximum diameter $(D_{max\_1}, D_{max\_2}, D_{max\_3})$ of each measurement cross section where the amount of distortion relative to the diameter of a standard circle is largest and the length of the minimum diameter $(D_{min\_1}, D_{min\_2}, D_{min\_3})$ where the amount of distortion relative to the diameter of the standard circle is smallest; and obtaining six independent components $(\sigma_{xx}, \sigma_{yy}, \sigma_{zz}, \tau_{xy}, \tau_{yz}, \tau_{zx})$ among stress tensors for defining the three-dimensional stress elements from first to sixth equations below, wherein the first equation (1) represents a difference $(\Delta\sigma_{\_1})$ between a maximum stress $(\sigma_{max\_1})$ and the minimum stress $(\sigma_{min\_1})$ acting on the side-wall core along the first measurement cross section, $$\sigma_{max\_1} - \sigma_{min\_1} = \sqrt{\left(\sigma_{z_1} - \sigma_{\theta_1}\right)^2 + 4\tau_{\theta z_1}^2} = \frac{E}{1+\mu} \cdot \frac{D_{max\_1} - D_{min\_1}}{D_{min\_1}} \quad (1)$$

the second equation (2) represents an angle ($\omega_{max\_1}$) formed by the excavation direction of the well and the action direction of the maximum stress ($\sigma_{max\_1}$) on the first measurement cross section, $$\omega_{max\_1} = \frac{1}{2}\tan^{-1}\left(\frac{2\tau_{\theta z\_1}}{\sigma_{z\_1} - \sigma_{\theta\_1}}\right) + \frac{\pi}{2} \quad (2)$$

$$\sigma_{\theta\_1} = \frac{(\sigma_{xx} + \sigma_{yy})}{2}\left(1 + \frac{R^2}{r_1^2}\right) -$$

$$\frac{(\sigma_{xx} - \sigma_{yy})}{2}\left(1 + \frac{3R^4}{r_1^4}\right)\cos2\theta_{SWC\_1} - \tau_{xy}\left(1 + \frac{3R^4}{r_1^4}\right)\sin2\theta_{swc\_1}$$

$$\sigma_{z\_1} = \sigma_{zz} - 2\mu(\sigma_{xx} - \sigma_{yy})\frac{R^2}{r_1^2}\cos2\theta_{SWC\_1} - 4\mu\tau_{xy}\frac{R^2}{r_1^2}\sin2\theta_{SWC\_1}$$

$$\tau_{\theta z\_1} = (-\tau_{zx}\sin\theta_{SWC\_1} + \tau_{yz}\cos\theta_{SWC\_1})\left(1 + \frac{R^2}{r_1^2}\right)$$

the third equation (3) represents a difference ($\Delta\sigma_{\_2}$) between the maximum stress ($\sigma_{max\_2}$) and the minimum stress ($\sigma_{min\_2}$) acting on the side-wall core along the second measurement cross section, $$\sigma_{max\_2} - \sigma_{min\_2} = \sqrt{(\sigma_{z\_2} - \sigma_{\theta\_2})^2 + 4\tau_{\theta z\_2}^2} = \frac{E}{1+\mu} \cdot \frac{D_{max\_2} - D_{min\_2}}{D_{min\_2}} \quad (3)$$

the fourth equation (4) represents an angle ($\omega_{max\_2}$) formed by the excavation direction of the well and the action direction of the maximum stress ($\sigma_{max\_2}$) on the second measurement cross section, $$\omega_{max\_2} = \frac{1}{2}\tan^{-1}\left(\frac{2\tau_{\theta z\_2}}{\sigma_{z\_2} - \sigma_{\theta\_2}}\right) + \frac{\pi}{2} \quad (4)$$

$$\sigma_{\theta\_2} = \frac{(\sigma_{xx} + \sigma_{yy})}{2}\left(1 + \frac{R^2}{r_2^2}\right) -$$

$$\frac{(\sigma_{xx} - \sigma_{yy})}{2}\left(1 + \frac{3R^4}{r_2^4}\right)\cos2\theta_{SWC\_2} - \tau_{xy}\left(1 + \frac{3R^4}{r_2^4}\right)\sin2\theta_{swc\_2}$$

$$\sigma_{z\_2} = \sigma_{zz} - 2\mu(\sigma_{xx} - \sigma_{yy})\frac{R^2}{r_2^2}\cos2\theta_{SWC\_2} - 4\mu\tau_{xy}\frac{R^2}{r_2^2}\sin2\theta_{SWC\_2}$$

$$\tau_{\theta z\_2} = (-\tau_{zx}\sin\theta_{SWC\_2} + \tau_{yz}\cos\theta_{SWC\_2})\left(1 + \frac{R^2}{r_2^2}\right)$$

the fifth equation (5) represents a difference ($\Delta\sigma_{\_3}$) between the maximum stress ($\sigma_{max\_3}$) and the minimum stress ($\sigma_{min\_3}$) acting on the side-wall core along the third measurement cross section, and $$\sigma_{max\_3} - \sigma_{min\_3} = \sqrt{(\sigma_{z\_3} - \sigma_{\theta\_3})^2 + 4\tau_{\theta z\_3}^2} = \frac{E}{1+\mu} \cdot \frac{D_{max\_3} - D_{min\_3}}{D_{min\_3}} \quad (5)$$

the sixth equation (6) represents an angle ($\omega_{max\_3}$) formed by the excavation direction of the well and the action direction of the maximum stress ($\sigma_{max\_3}$) on the third measurement cross section.

$$\omega_{max\_3} = \frac{1}{2}\tan^{-1}\left(\frac{2\tau_{\theta z\_3}}{\sigma_{z\_3} - \sigma_{\theta\_3}}\right) + \frac{\pi}{2} \quad (6)$$

-continued $$\sigma_{\theta\_3} = \frac{(\sigma_{xx} + \sigma_{yy})}{2}\left(1 + \frac{R^2}{r_3^2}\right) -$$

$$\frac{(\sigma_{xx} - \sigma_{yy})}{2}\left(1 + \frac{3R^4}{r_3^4}\right)\cos2\theta_{SWC\_3} - \tau_{xy}\left(1 + \frac{3R^4}{r_3^4}\right)\sin2\theta_{swc\_3}$$

$$\sigma_{z\_3} = \sigma_{zz} - 2\mu(\sigma_{xx} - \sigma_{yy})\frac{R^2}{r_3^2}\cos2\theta_{SWC\_3} - 4\mu\tau_{xy}\frac{R^2}{r_3^2}\sin2\theta_{SWC\_3}$$

$$\tau_{\theta z\_3} = (-\tau_{zx}\sin\theta_{SWC\_3} + \tau_{yz}\cos\theta_{SWC\_3})\left(1 + \frac{R^2}{r_3^2}\right)$$

where, degrees of variables below are regarded as being already known, and the first to third measurement cross sections are set such that pairs of values of (r, $\theta_{SWC}$) do not become the same. That is, the excavation direction of each side-wall core and distances (r) from a center of the well to the measurement cross sections are set such that pairs of values of the distance from the center of the well and an angle $\theta_{SWC}$ formed by a standard orientation and the excavation direction of the side-wall core do not completely coincide between different measurement cross sections.

R: a radius of the well, E: Young's modulus of the ground, $\mu$: Poisson's ratio of the ground, $D_{max\_1}$: the length of the maximum diameter of the first measurement cross section where the amount of distortion relative to the diameter of the standard circle is largest, $D_{min\_1}$: the length of the minimum diameter of the first measurement cross section where the amount of distortion relative to the diameter of the standard circle is smallest, $D_{max\_2}$: the length of the maximum diameter of the second measurement cross section where the amount of distortion relative to the diameter of the standard circle is largest, $D_{min\_2}$: the length of the minimum diameter of the second measurement cross section where the amount of distortion relative to the diameter of the standard circle is smallest, $D_{max\_3}$: the length of the maximum diameter of the third measurement cross section where the amount of distortion relative to the diameter of the standard circle is largest, $D_{min\_3}$: the length of the minimum diameter of the third measurement cross section where the amount of distortion relative to the diameter of the standard circle is smallest, $r_1$: a distance from a center of the well to the first measurement cross section, $r_2$: a distance from the center of the well to the second measurement cross section, $r_3$: a distance from the center of the well to the third measurement cross section, $\theta_{swc\_1}$, $\theta_{swc\_2}$, $\theta_{swc\_3}$: an angle formed by a standard orientation and the excavation direction of the side-wall core, $\omega_{max\_1}$: the angle formed by the excavation direction of the well and the action direction of the maximum stress on the first measurement cross section, $\omega_{max\_2}$: the angle formed by the excavation direction of the well and the action direction of the maximum stress on the second measurement cross section,

5

$\omega_{max\_3}$: the angle formed by the excavation direction of the well and the action direction of the maximum stress on the third measurement cross section.

In the in-situ stress measurement method according to the present invention, a plurality of the side-wall cores may be acquired by hollowing out the ground from the inner circumferential surface of the well in the direction different from the excavation direction of the well, and the first, second, and third measurement cross sections may be set in the plurality of side-wall cores.

Furthermore, angles formed by a direction where the ground has been hollowed while acquiring each side-wall core relative to the standard orientation of the well may be different from each other in the plurality of side-wall cores. That is, the plurality of side-wall cores may be acquired by hollowing out the ground in mutually different directions.

Advantageous Effects of Invention

According to the in-situ stress measurement method according to the present invention, it is possible to accurately measure three-direction stresses even in a well excavated in a direction inclined with respect to the vertical direction and to precisely infer the dynamic environment around the tectonic ground. This makes it possible to efficiently acquire underground fossil fuels such as petroleum and natural gas. Furthermore, in a variety of projects where it is extremely important to infer stresses in rock grounds at a deep depth such as energy development fields such as methane hydrate mining or geothermal utilization, the prediction of volcanic eruption or earthquakes, the underground storage of carbon dioxide, and the geological disposal of radioactive waste, stresses in rock grounds can be accurately measured by carrying out the present invention.

6

Figure 5:
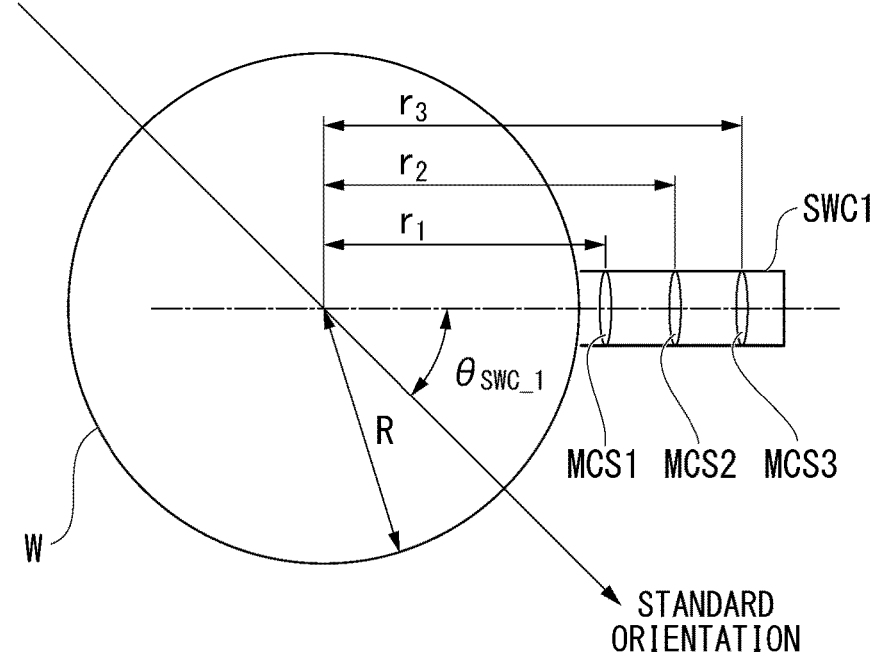

FIG. 5 is a view showing a location of a side-wall core to be acquired through the inclined well from the tectonic ground located at a certain depth from the ground surface.

Figure 6:
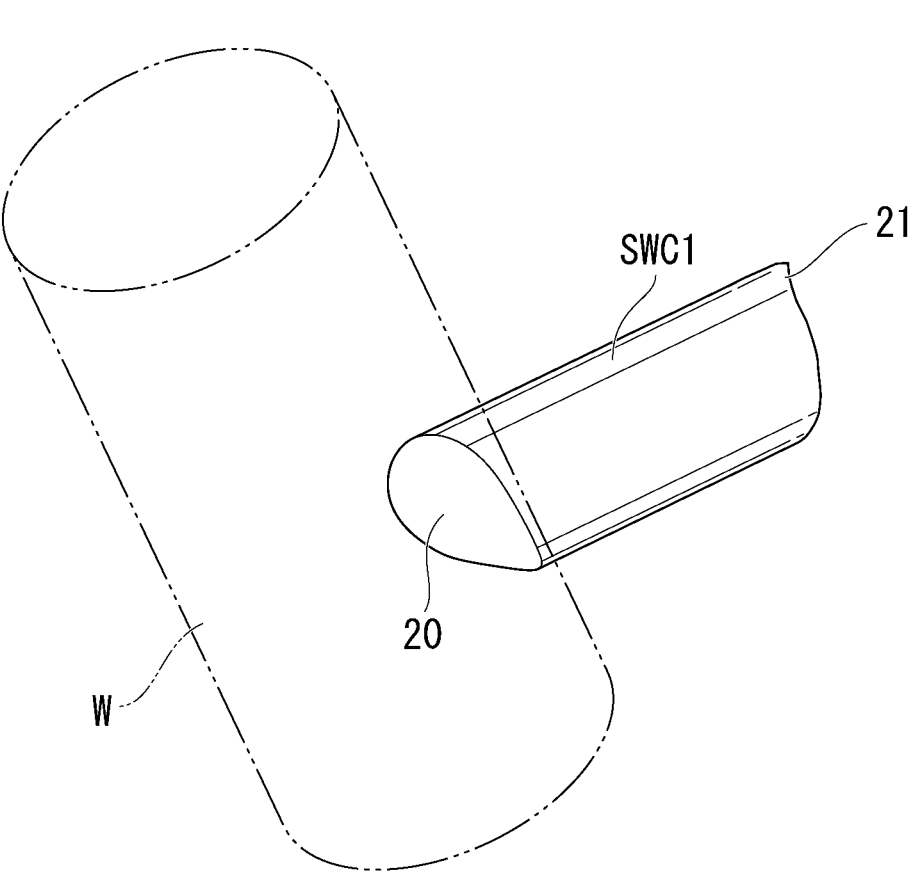

FIG. 6 is a view describing how to acquire information for inferring an orientation of the side-wall core in the ground.

Figure 7:
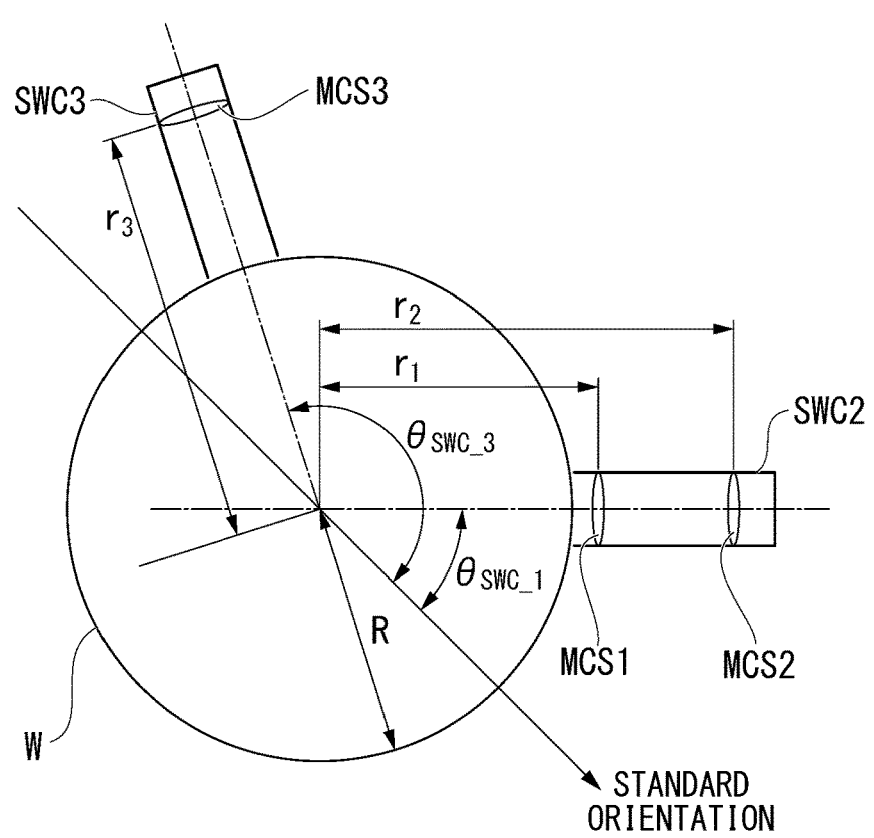

FIG. 7 is a view describing a first modification example of the in-situ stress measurement method according to the present invention and a view showing locations of two side-wall cores to be acquired through the inclined well from the tectonic ground located at a certain depth from the ground surface.

Figure 8:
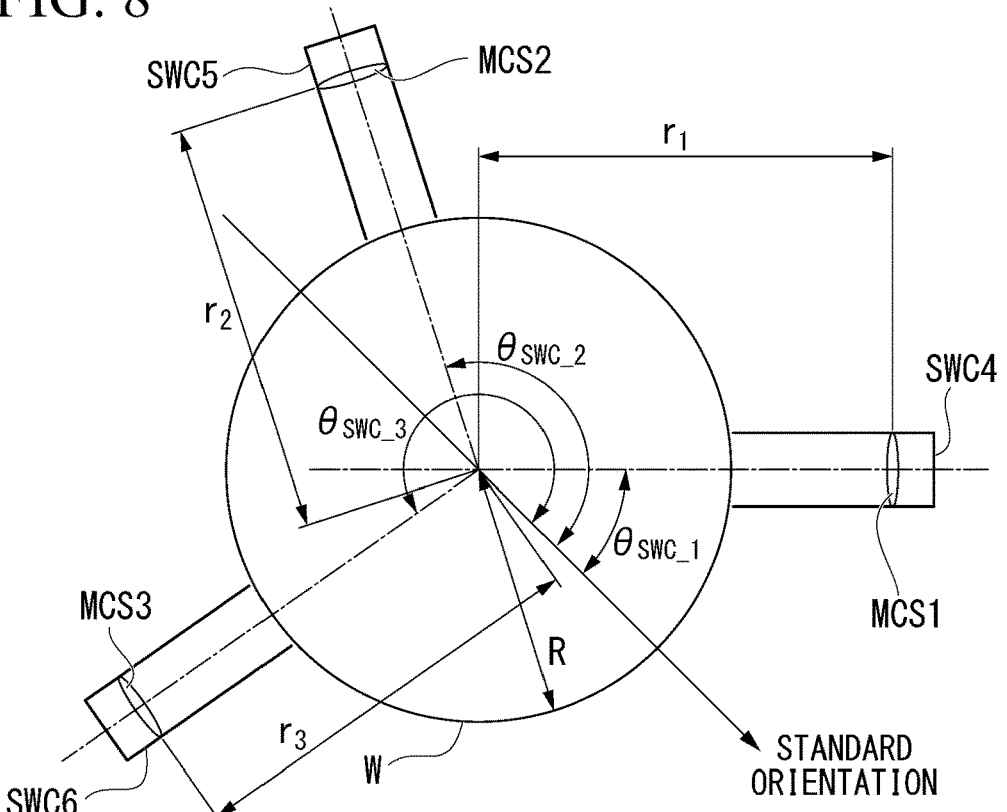

FIG. 8 is a view describing a second modification example of the in-situ stress measurement method according to the present invention and a view showing locations of three side-wall cores to be acquired from the inclined well from the tectonic ground located at a certain depth from the ground surface.

DESCRIPTION OF EMBODIMENTS

Hereinafter, a first embodiment of an in-situ stress measurement method according to the present invention will be described in detail with reference to FIG. 1A to FIG. 8.

Figure 1A:
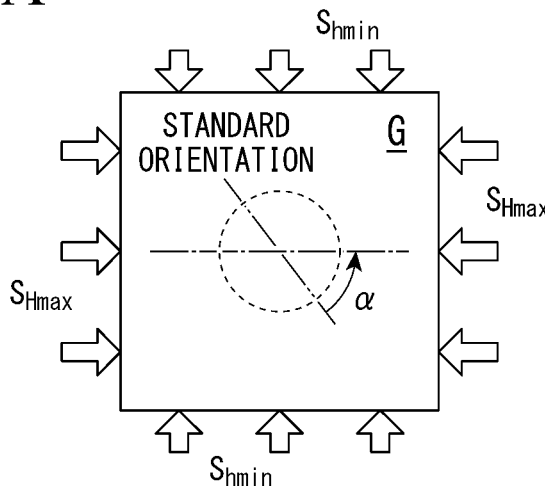
FIG. 1A is a view describing a first embodiment of an in-situ stress measurement method according to the present invention and a view schematically showing a status in which, among three-dimensional stresses acting on tectonic ground located at a certain depth from the ground surface, the maximum horizontal stress ($S_{Hmax}$) and the minimum horizontal stress ($S_{hmin}$) act on the same ground.

Three-dimensional stress elements of tectonic ground include four elements of the maximum horizontal stress, the minimum horizontal stress, the vertical stress, and the direction in which the maximum horizontal stress acts, and, in the tectonic ground below the earth's surface, a variety of forces represented by the above-described three-dimensional stress elements act in any places. When a certain place in the tectonic ground which is located at a certain depth from the ground surface is taken into account, it is possible to regard that, in this place, as shown in FIG. 1A, in the horizontal plane of a ground G, the maximum horizontal stress ($S_{Hmax}$) acts in a certain direction, the minimum horizontal stress ($S_{hmin}$) acts in a direction orthogonal to the direction in which the maximum horizontal stress ($S_{Hmax}$) acts, and, furthermore, a vertical stress ($S_v$) acts in the vertical direction.

When this tectonic ground is excavated vertically downward from the ground surface to form a well (hereinafter, referred to as the vertical well), the ground G is hollowed out in the excavation direction at a certain depth in the process of excavating this vertical well to acquire a cylindrical core shown in FIG. 1B. On the ground G from which the core needs to be acquired, the maximum horizontal stress ($S_{Hmax}$), the minimum horizontal stress ($S_{hmin}$), and the vertical stress ($S_v$) act as described above, and thus the ground G is in a state of being compressed from the circumference in the horizontal plane and, furthermore, being compressed in the longitudinal direction. When a cylindrical core is removed as a boring core BC from the ground G in such a state, the boring core BC is relaxed from the stresses acting from the circumferential ground and thus extends in the longitudinal direction and expands so as to increase the diameter. When seen in a cross section orthogonal to the longitudinal direction of the boring core BC, that is, a cross section present in the horizontal plane in the ground, the boring core that is a precise circle in the ground is relieved from restraint and enlarges from the center so that the diameter increases in all directions around the circumference.

Figure 1B:
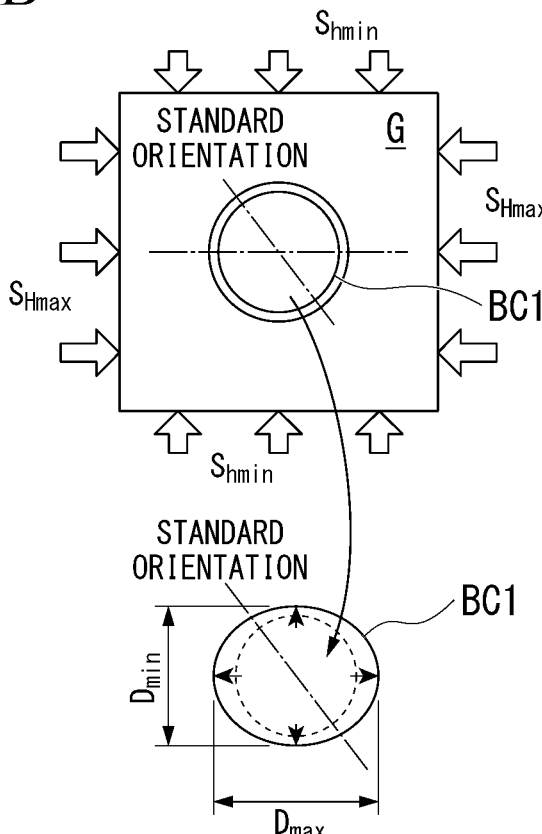
FIG. 1B is a view describing the first embodiment of the in-situ stress measurement method according to the present invention and a view schematically showing how a cross section of a boring core acquired in a process of excavating an inclined well from the ground located at a depth deforms.

When a measurement cross section is set in a direction orthogonal to the longitudinal direction at a certain location in the longitudinal direction in the boring core BC removed from the vertical well, and the shape of the measurement cross section is observed, the amount of expansion in a direction in which the maximum horizontal stress ($S_{Hmax}$) has acted is largest, and the amount of expansion in a direction in which the minimum horizontal stress ($S_{hmin}$) has acted is smallest as shown in FIG. 1B. In other words, in the direction in which the maximum horizontal stress ($S_{Hmax}$) has acted, the amount of distortion relative to the diameter of a standard circle (the diameter of the boring core BC when being in the ground and receiving the horizontal stresses) of the measurement cross section appears to be largest, in the direction in which the minimum horizontal stress ($S_{hmin}$) has acted, the amount of distortion relative to the diameter of the standard circle of the measurement cross section appears to be smallest, and the boring core changes to an elliptical shape as a whole.

Figure 2:
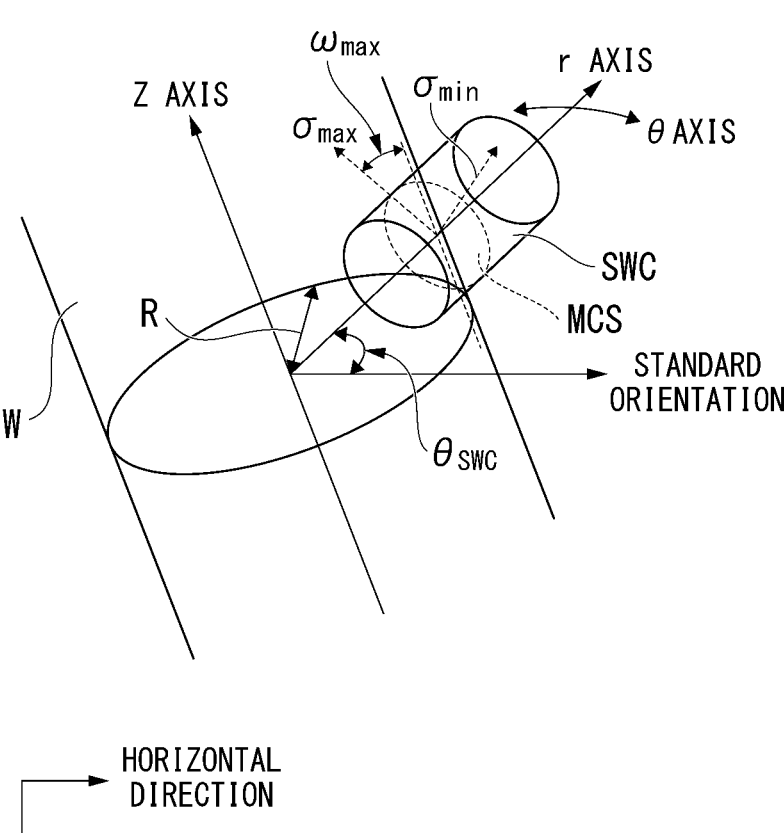
FIG. 2 is a view showing a status in which, in the inclined well, the ground located at a predetermined depth from the ground surface is hollowed out from an inner circumferential surface of the inclined well W in a predetermined direction to acquire a side-wall core.

The changes in the dimensions of the core as described above are not limited to the boring core BC acquired from the vertical well, but also appear in a core acquired from a well W excavated in a Z-axis direction inclined with respect to the vertical direction from the ground surface (hereinafter, referred to as the inclined well) as shown in FIG. 2. That is, in the inclined well W, when the ground located at a predetermined depth from the ground surface is hollowed out from the inner circumferential surface of the inclined well W in a direction different from the excavation direction (Z-axis direction) of the inclined well W (r-axis direction) to acquire a cylindrical core (hereinafter, referred to as the side-wall core) SWC1, this side-wall core SWC1 is also, similar to the boring core BC, relaxed from the stresses acting from the circumferential ground, extends the longitudinal direction, and expands so as to increase the diameter.

Hereinafter, in the side-wall core SWC1 acquired from the inclined well W, first, second, and third measurement cross sections are set at three places spaced apart in the longitudinal direction, and, in each measurement cross section, the length of the maximum diameter ($D_{max\_1}$, $D_{max\_2}$, $D_{max\_3}$) where the amount of distortion relative to the diameter of a standard circle is largest and the length of the minimum diameter ($D_{min\_1}$, $D_{min\_2}$, $D_{min\_3}$) where the amount of distortion relative to the diameter of the standard circle is smallest are measured.

Figure 3A:
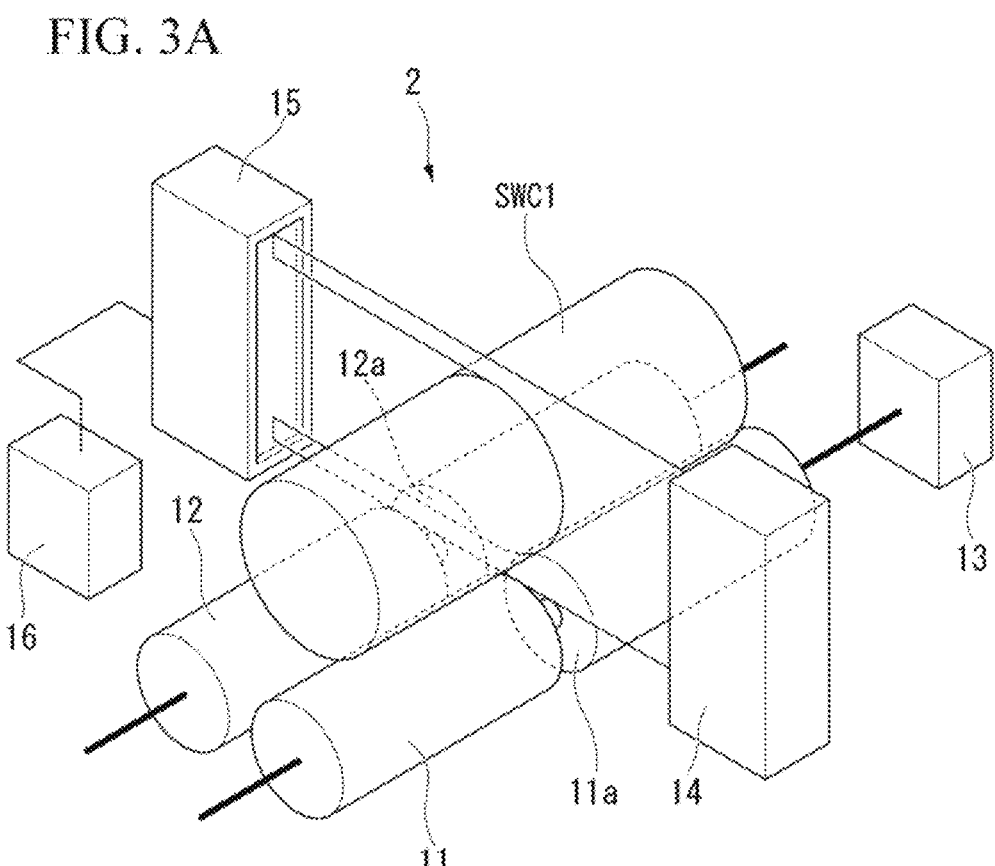
FIG. 3A is a schematic view of a measurement apparatus for measuring a diameter of the boring core and a perspective view showing a state in which the boring core is mounted in the measurement apparatus.
Figure 3B:
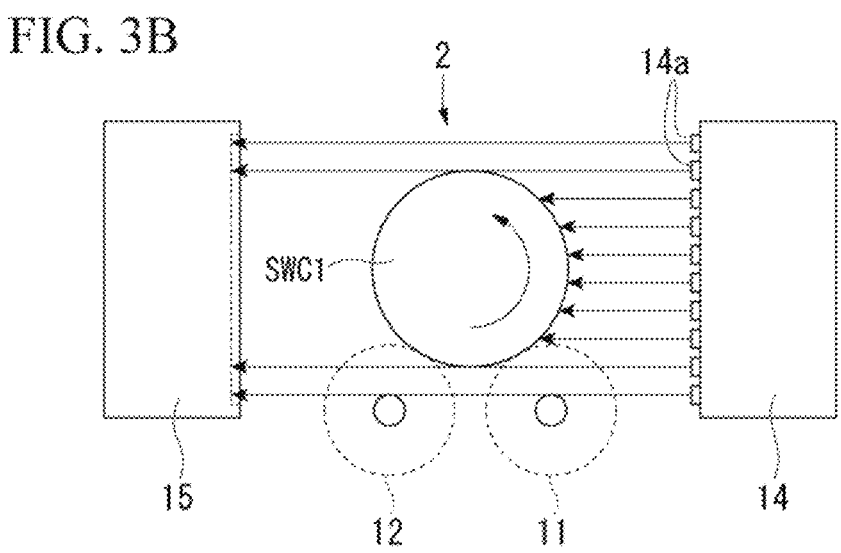
FIG. 3B is a schematic view of the measurement apparatus for measuring the diameter of the boring core and a view schematically showing how LED light radiated from a radiation portion to the boring core is received by a light-receiving portion.

As shown in FIG. 3A, the side-wall core SWC1 is mounted in a measurement apparatus 2 as a sample. The measurement apparatus 2 is provided with a pair of rollers 11 and 12 that are arranged in parallel and are rotatable. One roller 11 is rotated by a driving device 13. Contracted portions 11a and 12a are formed at almost the centers of both rollers 11 and 12 in the longitudinal direction. The side-wall core SWC1 is placed on both rollers 11 and 12 astride and is rotated reversely with respect to both rollers by rotating both rollers 11 and 12 in the same direction. A radiation portion 14 that is configured to radiate LED light toward almost the centers of both rollers 11 and 12 is provided on one side of the centers of both rollers 11 and 12. In the radiation portion 14, a plurality of LED elements 14a that emit highly directional LED light is disposed in tandem. LED light radiated from the radiation portion 14 is radiated as if the LED light traverses the side-wall core SWC1 placed on both rollers 11 and 12 in a cross-sectional direction thereof as shown in FIG. 3B. LED light is radiated through the contracted portions 11a and 12a of both rollers 11 and 12 and is thus not blocked by either roller. On the other side of both rollers 11 and 12, a light-receiving portion 15 that is configured to receive LED light radiated from the radiation portion 14 is provided. The width of LED light radiated from the radiation portion 14 is wider than the diameter of the side-wall core SWC1, and thus the light-receiving portion 15 receives LED light that is not blocked by the side-wall core SWC1 in a vertically split form. A measuring instrument 16 that is configured to measure the diameter of the side-wall core SWC1 is connected to the light-receiving portion 15.

The measurement apparatus 2 configured as described above radiates LED light toward the measurement cross section of the side-wall core SWC1 from the light-receiving portion 15 while rotating the side-wall core SWC1 at a constant rate with the driving device 13. The LED light radiated to the side-wall core SWC1 is partially blocked by the core, but is received in a vertically split form by the light-receiving portion 15. The measuring instrument 16 specifies an interval of the LED light received by the light-receiving portion 15 in a vertically split form and measures the diameter of the measurement cross section of the side-wall core SWC1. That is, the side-wall core SWC1 is rotated once while radiating LED light to the side-wall core SWC1, and the diameter of the side-wall core SWC1 is paired and recorded with every rotation angle, whereby the diameter of the measurement cross section of the side-wall core SWC1 can be measured throughout the entire circumference of the core.

Figure 4:
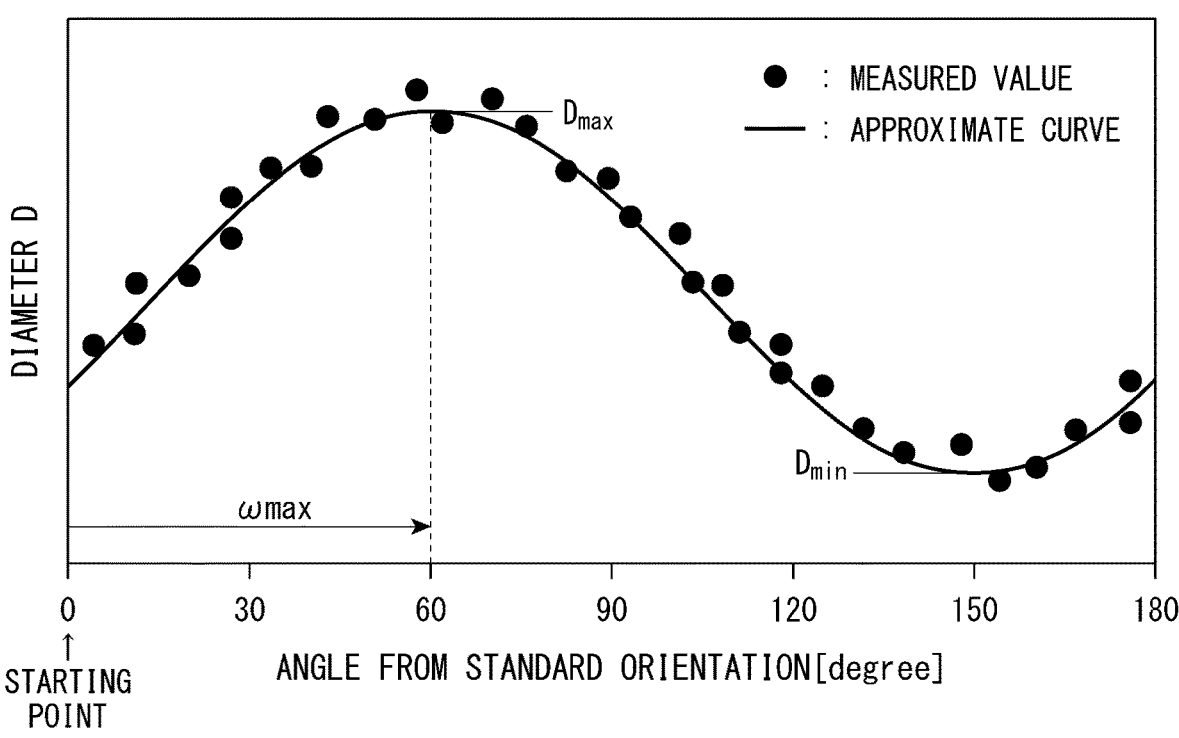
FIG. 4 is a graph showing results of measuring lengths of cross-sectional diameters of the boring core throughout the entire circumference of the core.

When plotted, the measurement results of the cross-sectional shape of the side-wall core SWC1 with the measurement apparatus 2 can be shown in a graph of FIG. 4. This graph shows the diameter of the side-wall core SWC1 that changes along angles from a standard orientation from, as a starting point, one point on the outer circumference with which the standard orientation intersects. The plotted points include errors, and thus an approximate curve is obtained using the least-square method or the like (a sine curve in the graph). The maximum value appearing on this approximate curve is the length of the maximum diameter of the measurement cross section, and it is possible to regard that the maximum stress acts in that direction. In addition, the minimum value appearing on this approximate curve is the length of the minimum diameter of the measurement cross section, and it is possible to regard that the minimum stress acts in that direction.

Three measurement cross sections are set at mutually different portions in the longitudinal direction in the side-wall core SWC1, and LED light is radiated three times to locations corresponding to the individual measurement cross sections on the outer circumferential surface of the side-wall core SWC1. First, in the first LED light radiation, the length of the maximum diameter ($D_{max\_1}$) where the amount of distortion relative to the diameter of the standard circle is largest and the length of the minimum diameter ($D_{min\_1}$) where the amount of distortion relative to the diameter of the standard circle is smallest of the first measurement cross section are measured. Next, in the second LED light radiation, the length of the maximum diameter ($D_{max\_2}$) where the amount of distortion relative to the diameter of the standard circle is largest and the length of the minimum diameter ($D_{min\_2}$) where the amount of distortion relative to the diameter of the standard circle is smallest of the second measurement cross section are measured. Furthermore, in the third LED light radiation, the length of the maximum diameter ($D_{max\_3}$) where the amount of distortion relative to the diameter of the standard circle is largest and the length of the minimum diameter ($D_{min\_3}$) where the amount of distortion relative to the diameter of the standard circle is smallest of the third measurement cross section are measured.

By the way, where the standard orientation of the tectonic ground from which the side-wall core SWC1 has been acquired is directed can be found by, for example, a method below. That is, image data of the inner circumferential surface captured throughout the entire circumference of the inclined well W are acquired at the depth from which the side-wall core SWC1 has been acquired. At that time, since characteristics showing where the standard orientation is directed (the inclination of the striped pattern, rocks, and the like) appear on the image data of the inner circumferential surface, where the standard orientation of the tectonic ground from which the side-wall core SWC1 has been acquired is directed is clarified by comparing the image data of the inner circumferential surface of the inclined well W and the state of the outer circumference of the side-wall core SWC1. Alternatively, to an excavation apparatus inserted into the inclined well W to acquire the side-wall core SWC1, a function capable of recording where the standard orientation of the tectonic ground from which the side-wall core SWC1 has been acquired is directed may be added.

The difference between the maximum stress ($\sigma_{max\_1}$) and the minimum stress ($\sigma_{min\_1}$) acting on the side-wall core SWC1 along the first measurement cross section, that is, a differential stress ($\sigma_{max\_1} - \sigma_{min\_1}$) on the first measurement cross section of the side-wall core SWC1 can be represented by equation (1) below.

$$\sigma_{max\_1} - \sigma_{min\_1} = \sqrt{(\sigma_{z_1} - \sigma_{\theta_1})^2 + 4\tau_{\theta z_1}^2} = \frac{E}{1+\mu} \cdot \frac{D_{max\_1} - D_{min\_1}}{D_{min\_1}} \quad (1)$$

The angle formed by the excavation direction of the inclined well W and the action direction of the maximum stress ($\sigma_{max\_1}$) in the first measurement cross section of the side-wall core SWC1, that is, a deviation angle ($\omega_{max\_1}$) formed by the maximum principal stress axis orientation in the first measurement cross section of the side-wall core SWC1 and the central axis line (Z axis) of the inclined well W can be represented by equation (2) below.

$$\omega_{max\_1} = \frac{1}{2}\tan^{-1}\left(\frac{2\tau_{\theta z\_1}}{\sigma_{z\_1} - \sigma_{\theta\_1}}\right) + \frac{\pi}{2} \quad (2)$$

$$\sigma_{\theta\_1} = \frac{(\sigma_{xx} + \sigma_{yy})}{2}\left(1 + \frac{R^2}{r_1^2}\right) -$$

$$\frac{(\sigma_{xx} - \sigma_{yy})}{2}\left(1 + \frac{3R^4}{r_1^4}\right)\cos2\theta_{SWC\_1} - \tau_{xy}\left(1 + \frac{3R^4}{r_1^4}\right)\sin2\theta_{swc\_1}$$

$$\sigma_{z\_1} = \sigma_{zz} - 2\mu(\sigma_{xx} - \sigma_{yy})\frac{R^2}{r_1^2}\cos2\theta_{SWC\_1} - 4\mu\tau_{xy}\frac{R^2}{r_1^2}\sin2\theta_{SWC\_1}$$

$$\tau_{\theta z\_1} = (-\tau_{zx}\sin\theta_{SWC\_1} + \tau_{yz}\cos\theta_{SWC\_1})\left(1 + \frac{R^2}{r_1^2}\right)$$

The difference between the maximum stress ($\sigma_{max\_2}$) and the minimum stress ($\sigma_{min\_2}$) acting on the side-wall core SWC1 along the second measurement cross section, that is, a differential stress ($\sigma_{max\_2} - \sigma_{min\_2}$) on the second measurement cross section of the side-wall core SWC1 can be represented by equation (3) below.

$$\sigma_{max\_2} - \sigma_{min\_2} = \sqrt{(\sigma_{z\_2} - \sigma_{\theta\_2})^2 + 4\tau_{\theta z\_2}^2} = \frac{E}{1+\mu} \cdot \frac{D_{max\_2} - D_{min\_2}}{D_{min\_2}} \quad (3)$$

The angle formed by the excavation direction of the inclined well W and the action direction of the maximum stress ($\sigma_{max\_2}$) in the second measurement cross section of the side-wall core SWC1, that is, a deviation angle ($\omega_{max\_2}$) formed by the maximum principal stress axis orientation in the second measurement cross section of the side-wall core SWC1 and the central axis line (Z axis) of the inclined well W can be represented by equation (4) below.

$$\omega_{max\_2} = \frac{1}{2}\tan^{-1}\left(\frac{2\tau_{\theta z\_2}}{\sigma_{z\_2} - \sigma_{\theta\_2}}\right) + \frac{\pi}{2} \quad (4)$$

$$\sigma_{\theta\_2} = \frac{(\sigma_{xx} + \sigma_{yy})}{2}\left(1 + \frac{R^2}{r_2^2}\right) -$$

$$\frac{(\sigma_{xx} - \sigma_{yy})}{2}\left(1 + \frac{3R^4}{r_2^4}\right)\cos2\theta_{SWC\_2} - \tau_{xy}\left(1 + \frac{3R^4}{r_2^4}\right)\sin2\theta_{swc\_2}$$

$$\sigma_{z\_2} = \sigma_{zz} - 2\mu(\sigma_{xx} - \sigma_{yy})\frac{R^2}{r_2^2}\cos2\theta_{SWC\_2} - 4\mu\tau_{xy}\frac{R^2}{r_2^2}\sin2\theta_{SWC\_2}$$

$$\tau_{\theta z\_2} = (-\tau_{zx}\sin\theta_{SWC\_2} + \tau_{yz}\cos\theta_{SWC\_2})\left(1 + \frac{R^2}{r_2^2}\right)$$

The difference between the maximum stress ($\sigma_{max\_3}$) and the minimum stress ($\sigma_{min\_3}$) acting on the side-wall core SWC1 along the third measurement cross section, that is, a differential stress ($\sigma_{max\_3} - \sigma_{min\_3}$) on the third measurement cross section of the side-wall core SWC1 can be represented by equation (5) below.

$$\sigma_{max\_3} - \sigma_{min\_3} = \sqrt{(\sigma_{z\_3} - \sigma_{\theta\_3})^2 + 4\tau_{\theta z\_3}^2} = \frac{E}{1+\mu} \cdot \frac{D_{max\_3} - D_{min\_3}}{D_{min\_3}} \quad (5)$$

The angle formed by the excavation direction of the inclined well W and the action direction of the maximum stress ($\sigma_{max\_3}$) in the third measurement cross section of the side-wall core SWC1, that is, a deviation angle ($\omega_{max\_3}$) formed by the maximum principal stress axis orientation in the third measurement cross section of the side-wall core SWC1 and the central axis line (Z axis) of the inclined well W can be represented by equation (6) below.

$$\omega_{max\_3} = \frac{1}{2}\tan^{-1}\left(\frac{2\tau_{\theta z\_3}}{\sigma_{z\_3} - \sigma_{\theta\_3}}\right) + \frac{\pi}{2} \quad (6)$$

$$\sigma_{\theta\_3} = \frac{(\sigma_{xx} + \sigma_{yy})}{2}\left(1 + \frac{R^2}{r_3^2}\right) -$$

$$\frac{(\sigma_{xx} - \sigma_{yy})}{2}\left(1 + \frac{3R^2}{r_3^4}\right)\cos2\theta_{SWC\_3} - \tau_{xy}\left(1 + \frac{3R^2}{r_3^4}\right)\sin2\theta_{swc\_3}$$

$$\sigma_{z\_3} = \sigma_{zz} - 2\mu(\sigma_{xx} - \sigma_{yy})\frac{R^2}{r_3^2}\cos2\theta_{SWC\_3} - 4\mu\tau_{xy}\frac{R^2}{r_3^2}\sin2\theta_{SWC\_3}$$

$$\tau_{\theta z\_3} = (-\tau_{zx}\sin\theta_{SWC\_3} + \tau_{yx}\cos\theta_{SWC\_3})\left(1 + \frac{R^2}{r_3^2}\right)$$

Here, the magnitudes of the Young's moduli (E) of the ground and the magnitudes of the Poisson's ratios ($\mu$) of the ground included in equations (1), (3), and (5) are already known regardless of the information obtained by observing the side-wall core SWC1. In addition, the lengths of the maximum diameter ($D_{max\_1}$) and minimum diameter ($D_{min\_1}$) of the first measurement cross section, the lengths of the maximum diameter ($D_{max\_2}$) and minimum diameter ($D_{min\_2}$) of the second measurement cross section, and the lengths of the maximum diameter ($D_{max\_3}$) and minimum diameter ($D_{min\_3}$) of the third measurement cross section can be found by measuring the shape of each measurement cross section of the side-wall core SWC1 using the measurement apparatus 2.

In addition, among the variables included in equations (2), (4), and (6), the radius (R) of the inclined well W can be found by actually measuring the shape of the well.

In a state where the side-wall core SWC1 is present in the ground, a distance ($r_1$) from the center (Z axis) of the inclined well W to a first measurement cross section MCS1 is equal to a length obtained by adding the radius (R) of the inclined well W to the distance from the inner end face of the side-wall core SWC1 to the first measurement cross section MCS1 as shown in FIG. 5. Similarly, in a state where the side-wall core SWC1 is present in the ground, a distance ($r_2$) from the center of the inclined well W to a second measurement cross section MCS2 is equal to a length obtained by adding the radius (R) of the inclined well W to the distance from the inner end face of the side-wall core SWC1 to the second measurement cross section MCS2, and a distance ($r_3$) from the center of the inclined well W to a third measurement cross section MCS3 is equal to a length obtained by adding the radius (R) of the inclined well W to the distance from the inner end face of the side-wall core SWC1 to the third measurement cross section MCS3.

The inner end face of the side-wall core SWC1 refers to a surface forming a part of the inner circumferential surface of the inclined well W in a state where the side-wall core SWC1 is present in the ground. Which end face of the side-wall core SWC1 corresponds to the inner end face is clarified by observing both end faces of side-wall core SWC1. That is, as shown in FIG. 6, one end face of the side-wall core SWC1 is part of the inner circumferential surface of the cylindrically excavated inclined well W, and thus the shape is uniform such that the curvature draws a circular arc as if a part of the cylindrical shape has been cut out. On the other hand, the side-wall core SWC1 is acquired by hollowing out the ground and then fracturing the ground by applying a bending force along the excavation direction of the inclined well W, and thus the other end face forms an irregular fracture surface on which projections are formed so as to protrude in the direction along the excavation direction of the inclined well W instead of a neat shape as in the one end face. As described above, due to the difference in shape between both end faces of the side-wall core SWC1, it is possible to specify which end face of the side-wall core SWC1 corresponds to the inner end face. Furthermore, if it is possible to confirm the projections formed on the other end face, it is also possible to specify which portions of the side-wall core SWC1 are directed vertically in a state of being present in the ground. The distance ($r_1$, $r_2$, $r_3$) from the center of the inclined well W to each measurement cross section can be found as the sum of the radius R of the inclined well W and the distance from one end face (inner end face) of the side-wall core SWC1 to the measurement cross section.

The excavation direction of the side-wall core SWC1 in the inclined well W, that is, the angle ($\theta_{swc\_1}$, $\theta_{swc\_2}$, $\theta_{swc\_3}$) formed by the standard orientation and the excavation direction of the side-wall core can be found using a gyroscope embedded in a logging tool. The logging tool is a device that is configured to analyze the state of the inner circumferential surface of the inclined well W such as borehole breakout or drilling-induced tensile fracture caused by the excavation of the inclined well W and is also capable of evaluating the anisotropy of the S-wave velocity in a rock ground by dipole sonic waveform. In the present embodiment, since one side-wall core SWC1 is acquired, and three measurement cross sections are set in the side-wall core SWC1, the excavation direction of the side-wall core SWC1 is the same in all of the measurement cross sections ($\theta_{swc\_1}$, $\theta_{swc\_2}$ and $\theta_{swc\_3}$ are all equal). The standard orientation can be easily understood if, for example, the direction of the north is considered to be the standard orientation.

The center of the inclined well W and the direction where the maximum stress ($\sigma_{max\_1}$) acts on the first measurement cross section MCS1 are in distorted locations; however, when FIG. 2 is referred to, the angle formed by the central axis line of the inclined well W and the standard orientation and the angle formed by the direction where the maximum stress ($\sigma_{max\_1}$) acts on the first measurement cross section MCS1 and the standard orientation are each clear. Therefore, from the relationship between both, the deviation angle ($\omega_{max\_1}$) formed by the maximum principal stress axis orientation in the first measurement cross section MCS1 of the side-wall core SWC1 and the center (Z axis) of the inclined well W can be found.

Similarly, the deviation angle ($\omega_{max\_2}$) formed by the maximum principal stress axis orientation in the second measurement cross section MCS2 of the side-wall core SWC1 and the center (Z axis) of the inclined well W and the deviation angle ($\omega_{max\_3}$) formed by the maximum principal stress axis orientation in the second measurement cross section MCS2 and the center (Z axis) of the inclined well W can also be found from the relationships between the angle formed by the central axis line of the inclined well W and the standard orientation and the angles formed by the directions where the maximum stress ($\sigma_{max\_2}$, $\sigma_{max\_3}$) acts in the second and third measurement cross sections MCS2 and MCS3 and the standard orientation.

As described above, among the variables included in the above equations (1) to (6), the values of all variables except six variables ($\sigma_{xx}$, $\sigma_{yy}$, $\sigma_{zz}$, $\tau_{xy}$, $\tau_{yz}$, $\tau_{zx}$) that indicate six independent components of the stress tensors can be found by analyzing the on-site ground, the inclined well W, and a side-wall core acquired from the on-site ground through the inclined well W, and thus, when those values are assigned to individual variables of equations (1) to (6), equations (1) to (6) become six-dimensional simultaneous equations in which the six components ($\sigma_{xx}$, $\sigma_{yy}$, $\sigma_{zz}$, $\tau_{xy}$, $\tau_{yz}$, $\tau_{zx}$) of the stress tensors are unknowns. The three-dimensional stress elements of the on-site ground can be found by obtaining the values of the six components ($\sigma_{xx}$, $\sigma_{yy}$, $\sigma_{zz}$, $\tau_{xy}$, $\tau_{yz}$, $\tau_{zx}$) as the solutions to these six-dimensional simultaneous equations.

According to the embodiment of the in-situ stress measurement method according to the present invention, it is possible to accurately measure three-direction stresses even in a well excavated in a direction inclined with respect to the vertical direction and to precisely infer the dynamic environment around the tectonic ground. This makes it possible to efficiently acquire underground fossil fuels such as petroleum and natural gas. Furthermore, in a variety of projects where it is extremely important to infer stresses in rock grounds at a deep depth such as energy development fields such as methane hydrate mining or geothermal utilization, the prediction of volcanic eruption or earthquakes, the underground storage of carbon dioxide, and the geological disposal of radioactive waste, stresses in rock grounds can be accurately measured by carrying out the present invention.

In the embodiment, three measurement cross sections are set in one side-wall core SWC1, but a plurality of side-wall cores may be acquired, three or more measurement cross sections may be set in the side-wall cores, and six variables ($\sigma_{xx}$, $\sigma_{yy}$, $\sigma_{zz}$, $\tau_{xy}$, $\tau_{yz}$, $\tau_{zx}$) that indicate the six independent components of the stress tensors may be obtained by the above-described method. Hereinafter, two modification examples will be described.

First Modification Example

Next, a first modification example of the in-situ stress measurement method according to the present invention will be described with reference to FIG. 7. Matters that have been described in the embodiment will be only simply described in the present modification example.

In the present modification example, on the basis of information obtained by observing two side-wall cores SWC2 and SWC3 acquired from tectonic ground present at a certain depth from the earth's surface, three-dimensional stress elements acting on the tectonic ground from which these two cores have been acquired are obtained.

First, the ground located at a predetermined depth from the ground surface is hollowed out from the inner circumferential surface of the inclined well W in a direction different from the excavation direction of the inclined well W to acquire a cylindrical side-wall core SWC2. Furthermore, the same ground located at a predetermined depth from the earth's surface as the ground from which the side-wall core SWC2 has been acquired is hollowed out from the inner circumferential surface of the inclined well W in a direction orthogonal to the excavation direction of the inclined well W and different from the excavation direction of the side-wall core SWC2 to acquire a cylindrical side-wall core SWC3.

A first measurement cross section MCS1 and a second measurement cross section MCS2 are set in the side-wall core SWC2, the length of the maximum diameter ($D_{max\_1}$) where the amount of distortion relative to the diameter of the standard circle is largest and the length of the minimum diameter ($D_{min\_1}$) where the amount of distortion relative to the diameter of the standard circle is smallest of the first measurement cross section MCS1 are measured, and the length of the maximum diameter ($D_{max\_2}$) where the amount of distortion relative to the diameter of the standard circle is largest and the length of the minimum diameter ($D_{min\_2}$) where the amount of distortion relative to the diameter of the standard circle is smallest of the second measurement cross section MCS2 are measured using the measurement apparatus 2. In addition, a third measurement cross section MCS3 is set in the side-wall core SWC3, the length of the maximum diameter ($D_{max\_3}$) where the amount of distortion relative to the diameter of the standard circle is largest and the length of the minimum diameter ($D_{min\_3}$) where the amount of distortion relative to the diameter of the standard circle is smallest of the third measurement cross section MCS3 are measured using the measurement apparatus 2.

The shapes of the inclined well W and the side-wall cores SWC2, SWC3 are measured, and the distances ($r_1$, $r_2$) from the center of the inclined well W to the first and second measurement cross sections MCS1, MCS2 of the side-wall core SWC2, and the distance ($r_3$) from the center of the inclined well W to the third measurement cross section MCS3 of the side-wall core SWC3 are found by the above-described method.

In a state where the side-wall core SWC2 is present in the ground, the distance ($r_1$) from the center (Z axis) of the inclined well W to the first measurement cross section MCS1 is equal to a length obtained by adding the radius (R) of the inclined well W to the distance from the inner end face of the side-wall core SWC1 to the first measurement cross section MCS1, and the distance ($r_2$) from the center of the inclined well W to the second measurement cross section MCS2 is equal to a length obtained by adding the radius (R) of the inclined well W to the distance from the inner end face of the side-wall core SWC2 to the second measurement cross section. Similarly, in a state where the side-wall core SWC3 is present in the ground, the distance ($r_3$) from the center (Z axis) of the inclined well W to the third measurement cross section MCS3 is equal to a length obtained by adding the radius (R) of the inclined well W to the distance from the inner end face of the side-wall core SWC3 to the third measurement cross section MCS3.

The excavation direction ($\theta_{swc\_1}$, $\theta_{swc\_2}$) of the side-wall core SWC2 and the excavation direction ($\theta_{swc\_3}$) of the side-wall core SWC3 in the inclined well W are found using the gyroscope of the logging tool by the above-described method. In the present modification example, since two measurement cross sections are set in the side-wall core SWC2, the excavation direction of the side-wall core SWC2 is the same in both measurement cross sections ($\theta_{swc\_1}$ is equal to $\theta_{swc\_2}$).

The deviation angle ($\omega_{max\_1}$) formed by the maximum principal stress axis orientation in the first measurement cross section MCS1 of the side-wall core SWC2 and the center (Z axis) of the inclined well W and the deviation angle ($\omega_{max\_2}$) formed by the maximum principal stress axis orientation in the second measurement cross section MCS2 and the center (Z axis) of the inclined well W are found. Furthermore, the deviation angle ($\omega_{max\_3}$) formed by the maximum principal stress axis orientation in the third measurement cross section MCS3 of the side-wall core SWC3 and the center (Z axis) of the inclined well W is found by the above-described method.

As described above, among the variables included in the above equations (1) to (6), the values of all variables except six variables ($\sigma_{xx}$, $\sigma_{yy}$, $\sigma_{zz}$, $\tau_{xy}$, $\tau_{yz}$, $\tau_{zx}$) are found by analyzing the on-site ground, the inclined well W, and two side-wall cores SWC2, SWC3, and those values are assigned to individual variables of equations (1) to (6) to obtain the values of the six components ($\sigma_{xx}$, $\sigma_{yy}$, $\sigma_{zz}$, $\tau_{xy}$, $\tau_{yz}$, $\tau_{zx}$).

Second Modification Example

Next, a second modification example of the in-situ stress measurement method according to the present invention will be described with reference to FIG. 8. Matters that have been described in detail in the embodiment will be only simply described in the present modification example.

In the present modification example, on the basis of information obtained by observing three side-wall cores SWC4, SWC5, and SWC6 acquired from tectonic ground present at a certain depth from the earth's surface, three-dimensional stress elements acting on the tectonic ground from which the same cores have been acquired are obtained.

First, the ground located at a predetermined depth from the ground surface is hollowed out from the inner circumferential surface of the inclined well W in a direction different from the excavation direction of the inclined well W to acquire a cylindrical side-wall core SWC4. In addition, the same ground located at a predetermined depth from the earth's surface as the ground from which the side-wall core SWC4 has been acquired is hollowed out from the inner circumferential surface of the inclined well W in a direction orthogonal to the excavation direction of the inclined well W and different from the excavation direction of the side-wall core SWC4 to acquire a cylindrical side-wall core SWC5.

Furthermore, the same ground located at a predetermined depth from the earth's surface as the ground from which the side-wall cores SWC4, SWC5 have been acquired is hollowed out from the inner circumferential surface of the inclined well W in a direction orthogonal to the excavation direction of the inclined well W and also different from all excavation directions of the side-wall cores SWC4, SWC5 to acquire a cylindrical side-wall core SWC6.

A first measurement cross section MCS1 is set in the side-wall core SWC4, the length of the maximum diameter ($D_{max\_1}$) where the amount of distortion relative to the diameter of the standard circle is largest and the length of the minimum diameter ($D_{min\_1}$) where the amount of distortion relative to the diameter of the standard circle is smallest of the first measurement cross section MCS1 are measured using the measurement apparatus 2. In addition, a second measurement cross section MCS2 is set in the side-wall core SWC5, the length of the maximum diameter ($D_{max\_2}$) where the amount of distortion relative to the diameter of the standard circle is largest and the length of the minimum diameter ($D_{min\_2}$) where the amount of distortion relative to the diameter of the standard circle is smallest of the second measurement cross section MCS2 are measured using the measurement apparatus 2. Furthermore, a third measurement cross section MCS3 is set in the side-wall core SWC6, the length of the maximum diameter ($D_{max\_3}$) where the amount of distortion relative to the diameter of the standard circle is largest and the length of the minimum diameter ($D_{min\_3}$) where the amount of distortion relative to the diameter of the standard circle is smallest of the third measurement cross section MCS3 are measured using the measurement apparatus 2.

The shapes of the inclined well W and the side-wall cores SWC4, SWC5, and SWC6 are measured, and the distance ($r_1$) from the center of the inclined well W to the first measurement cross sections MCS1 of the side-wall core SWC4, the distance ($r_2$) from the center of the inclined well W to the second measurement cross sections MCS2 of the side-wall core SWC5, and the distance ($r_3$) from the center of the inclined well W to the third measurement cross section MCS3 of the side-wall core SWC6 are found by the above-described method.

In a state where the side-wall core SWC4 is present in the ground, a distance ($r_1$) from the center (Z axis) of the inclined well W to a first measurement cross section MCS1 is equal to a length obtained by adding the radius (R) of the inclined well W to the distance from the inner end face of the side-wall core SWC4 to the first measurement cross section MCS1. Similarly, in a state where the side-wall core SWC5 is present in the ground, the distance ($r_2$) from the center of the inclined well W to the second measurement cross section MCS2 is equal to a length obtained by adding the radius (R) of the inclined well W to the distance from the inner end face of the side-wall core SWC5 to the second measurement cross section MCS2. In a state where the side-wall core SWC6 is present in the ground, the distance ($r_3$) from the center (Z axis) of the inclined well W to the third measurement cross section MCS3 is equal to a length obtained by adding the radius (R) of the inclined well W to the distance from the inner end face of the side-wall core SWC6 to the third measurement cross section MCS3.

The excavation direction ($\theta_{swc\_1}$) of the side-wall core SWC4, the excavation direction ($\theta_{swc\_2}$) of the side-wall core SWC5, and the excavation direction ($\theta_{swc\_3}$) of the side-wall core SWC6 in the inclined well W are found using the gyroscope of the logging tool by the above-described method. In the present modification example, since one measurement cross section is set in each of the side-wall cores SWC4, SWC5, and SWC6, the excavation directions ($\theta_{swc\_1}$, $\theta_{swc\_2}$, $\theta_{swc\_3}$) of the side-wall cores SWC4, SWC5, and SWC6 are all different.

The deviation angle ($\omega_{max\_1}$) formed by the maximum principal stress axis orientation in the first measurement cross section MCS1 of the side-wall core SWC4 and the center (Z axis) of the inclined well W, and the deviation angle ($\omega_{max\_2}$) formed by the maximum principal stress axis orientation in the second measurement cross section MCS2 of the side-wall core SWC5 and the center (Z axis) of the inclined well W, and the deviation angle ($\omega_{max\_3}$) formed by the maximum principal stress axis orientation in the third measurement cross section MCS3 of the side-wall core SWC6 and the center (Z axis) of the inclined well W are also found by the above-described method.

As described above, among the variables included in the above equations (1) to (6), the values of all variables except six variables ($\sigma_{xx}$, $\sigma_{yy}$, $\sigma_{zz}$, $\tau_{xy}$, $\tau_{yz}$, $\tau_{zx}$) are found by analyzing the on-site ground, the inclined well W, and three side-wall cores SWC4, SWC5, and SWC6 and those values are assigned to individual variables of equations (1) to (6) to obtain the values of the six components ($\sigma_{xx}$, $\sigma_{yy}$, $\sigma_{zz}$, $\tau_{xy}$, $\tau_{yz}$, $\tau_{zx}$).

In the embodiment and modification examples 1 and 2, three measurement cross sections are set in the side-wall core, the values of desired variables are acquired in each measurement cross section, and these values are assigned to the individual variables of equations (1) to (6) to obtain the values of the six components ($\sigma_{xx}$, $\sigma_{yy}$, $\sigma_{zz}$, $\tau_{xy}$, $\tau_{yz}$, $\tau_{zx}$), but four or more measurement cross sections may be set, the values of desired variables may be acquired in each measurement cross section, these values are assigned to individual variables of numerical equations newly provided according to equations (1) to (6) and the number of the measurement cross sections, and the values of the six components ($\sigma_{xx}$, $\sigma_{yy}$, $\sigma_{zz}$, $\tau_{xy}$, $\tau_{yz}$, $\tau_{zx}$) may be obtained by the non-linear least-square method.

Hitherto, the preferred embodiment of the present invention and the modification examples thereof have been described in detail, but the present invention is not limited to such a specific embodiment or modification examples and can be modified in diverse forms within the scope of the gist of the present invention.

INDUSTRIAL APPLICABILITY

The present invention relates to a method for measuring three-dimensional stress elements acting on the situs of the ground configuring the earth's crust, that is, an in-situ stress measurement method. According to the present invention, it is possible to accurately measure three-direction stresses even in a well excavated in a direction inclined with respect to the vertical direction and to precisely infer the dynamic environment around the tectonic ground.

REFERENCE SIGNS LIST

G: TECTONIC GROUND
W: INCLINED WELL
SWC1 to SWC6: SIDE-WALL CORE
MCS1 to MCS3: MEASUREMENT CROSS SECTION

What is claimed is:

1. An in-situ stress measurement method for measuring three-dimensional stress elements acting on a ground configuring an earth's crust, comprising:

excavating the ground in a first excavation direction to form a well, the first excavation direction of the well being one of vertical direction or a direction inclined with respect to the vertical direction;

acquiring at least one cylindrical side-wall core by hollowing out the ground in the well at a predetermined depth from the earth's surface, from an inner circumferential surface of the well in a second excavation direction different from the first excavation direction of the well;

determining where a standard orientation of the ground from which the at least one cylindrical side-wall core has been acquired is directed;

setting at least first, second and third measurement cross sections in the side-wall core, wherein the first, second and third measurement cross sections are separated from each other in a longitudinal direction of the side-wall core;

measuring, in each of the shape of the first, second and third measurement cross sections, the length of the maximum diameter ($D_{max\_1}$, $D_{max\_2}$, $D_{max\_3}$) of each measurement cross section where the amount of distortion relative to the diameter of a standard circle is largest and the length of the minimum diameter ($D_{min\_1}$, $D_{min\_2}$, $D_{min\_3}$) where the amount of distortion relative to the diameter of the standard circle is smallest; and obtaining six independent components ($\sigma_{xx}$, $\sigma_{yy}$, $\sigma_{zz}$, $\tau_{xy}$, $\tau_{yz}$, $\tau_{zx}$) among stress tensors for defining the three-dimensional stress elements from first to sixth equations below, wherein the first equation (1) represents a difference ($\Delta\sigma\_1$) between a maximum stress ($\sigma_{max\_1}$) and the minimum stress ($\sigma_{min\_1}$) acting on the side-wall core along the first measurement cross section, $$\sigma_{max\_1} - \sigma_{min\_1} = \sqrt{(\sigma_{z_1} - \sigma_{\theta_1})^2 + 4\tau_{\theta z_1}^2} = \frac{E}{1+\mu} \cdot \frac{D_{max\_1} - D_{min\_1}}{D_{min\_1}} \quad (1)$$

the second equation (2) represents an angle ($\omega_{max\_1}$) formed by the first excavation direction of the well and the action direction of the maximum stress ($\sigma_{max\_1}$) on the first measurement cross section, $$\omega_{max\_1} = \frac{1}{2}\tan^{-1}\left(\frac{2\tau_{\theta z\_1}}{\sigma_{z\_1} - \sigma_{\theta\_1}}\right) + \frac{\pi}{2} \quad (2)$$

$$\sigma_{\theta\_1} = \frac{(\sigma_{xx} + \sigma_{yy})}{2}\left(1 + \frac{R^2}{r_1^2}\right) -$$

$$\frac{(\sigma_{xx} - \sigma_{yy})}{2}\left(1 + \frac{3R^4}{r_1^4}\right)\cos 2\theta_{SWC\_1} - \tau_{xy}\left(1 + \frac{3R^4}{r_1^4}\right)\sin 2\theta_{swc\_1}$$

$$\sigma_{z\_1} = \sigma_{zz} - 2\mu(\sigma_{xx} - \sigma_{yy})\frac{R^2}{r_1^2}\cos 2\theta_{SWC\_1} - 4\mu\tau_{xy}\frac{R^2}{r_1^2}\sin 2\theta_{SWC\_1}$$

$$\tau_{\theta z\_1} = (-\tau_{zx}\sin\theta_{SWC\_1} + \tau_{yz}\cos\theta_{SWC\_1})\left(1 + \frac{R^2}{r_1^2}\right)$$

the third equation (3) represents a difference ($\Delta\sigma\_2$) between the maximum stress ($\sigma_{max\_2}$) and the minimum stress ($\sigma_{min\_2}$) acting on the side-wall core along the second measurement cross section, $$\sigma_{max\_2} - \sigma_{min\_2} = \sqrt{(\sigma_{z\_2} - \sigma_{\theta\_2})^2 + 4\tau_{\theta z\_2}^2} = \frac{E}{1+\mu} \cdot \frac{D_{max\_2} - D_{min\_2}}{D_{min\_2}} \quad (3)$$

the fourth equation (4) represents an angle ($\omega_{max\_2}$) formed by the first excavation direction of the well and the action direction of the maximum stress ($\sigma_{max\_2}$) on the second measurement cross section, $$\omega_{max\_2} = \frac{1}{2}\tan^{-1}\left(\frac{2\tau_{\theta z\_2}}{\sigma_{z\_2} - \sigma_{\theta\_2}}\right) + \frac{\pi}{2} \quad (4)$$

$$\sigma_{\theta\_2} = \frac{(\sigma_{xx} + \sigma_{yy})}{2}\left(1 + \frac{R^2}{r_2^2}\right) -$$

$$\frac{(\sigma_{xx} - \sigma_{yy})}{2}\left(1 + \frac{3R^4}{r_2^4}\right)\cos 2\theta_{SWC\_2} - \tau_{xy}\left(1 + \frac{3R^4}{r_2^4}\right)\sin 2\theta_{swc\_2}$$

$$\sigma_{z\_2} = \sigma_{zz} - 2\mu(\sigma_{xx} - \sigma_{yy})\frac{R^2}{r_2^2}\cos 2\theta_{SWC\_2} - 4\mu\tau_{xy}\frac{R^2}{r_2^2}\sin 2\theta_{SWC\_2}$$

$$\tau_{\theta z\_2} = (-\tau_{zx}\sin\theta_{SWC\_2} + \tau_{yz}\cos\theta_{SWC\_2})\left(1 + \frac{R^2}{r_2^2}\right)$$

the fifth equation (5) represents a difference ($\Delta\sigma\_3$) between the maximum stress ($\sigma_{max\_3}$) and the minimum stress ($\sigma_{min\_3}$) acting on the side-wall core along the third measurement cross section, $$\sigma_{max\_3} - \sigma_{min\_3} = \sqrt{(\sigma_{z\_3} - \sigma_{\theta\_3})^2 + 4\tau_{\theta z\_3}^2} = \frac{E}{1+\mu} \cdot \frac{D_{max\_3} - D_{min\_3}}{D_{min\_3}} \quad (5)$$

and the sixth equation (6) represents an angle (@max_3) formed by the first excavation direction of the well and the action direction of the maximum stress ($\sigma_{max\_3}$) on the third measurement cross section, $$\omega_{max\_3} = \frac{1}{2}\tan^{-1}\left(\frac{2\tau_{\theta z\_3}}{\sigma_{z\_3} - \sigma_{\theta\_3}}\right) + \frac{\pi}{2} \quad (6)$$

$$\sigma_{\theta\_3} = \frac{(\sigma_{xx} + \sigma_{yy})}{2}\left(1 + \frac{R^2}{r_3^2}\right) -$$

$$\frac{(\sigma_{xx} - \sigma_{yy})}{2}\left(1 + \frac{3R^4}{r_3^4}\right)\cos 2\theta_{SWC\_3} - \tau_{xy}\left(1 + \frac{3R^4}{r_3^4}\right)\sin 2\theta_{swc\_3}$$

$$\sigma_{z\_3} = \sigma_{zz} - 2\mu(\sigma_{xx} - \sigma_{yy})\frac{R^2}{r_3^2}\cos 2\theta_{SWC\_3} - 4\mu\tau_{xy}\frac{R^2}{r_3^2}\sin 2\theta_{SWC\_3}$$

$$\tau_{\theta z\_3} = (-\tau_{zx}\sin\theta_{SWC\_3} + \tau_{yz}\cos\theta_{SWC\_3})\left(1 + \frac{R^2}{r_3^2}\right)$$

where, degrees of variables below are regarded as being already known, and the first to third measurement cross sections are set such that pairs of values of (r, $\theta_{SWC}$) do not become the same, R: a radius of the well, E: Young's modulus of the ground, $\mu$: Poisson's ratio of the ground, $D_{max\_1}$: the length of the maximum diameter of the first measurement cross section where the amount of distortion relative to the diameter of the standard circle is largest, $D_{min\_1}$: the length of the minimum diameter of the first measurement cross section where the amount of distortion relative to the diameter of the standard circle is smallest, $D_{max\_2}$: the length of the maximum diameter of the second measurement cross section where the amount of distortion relative to the diameter of the standard circle is largest, $D_{min\_2}$: the length of the minimum diameter of the second measurement cross section where the amount of distortion relative to the diameter of the standard circle is smallest, $D_{max\_3}$: the length of the maximum diameter of the third measurement cross section where the amount of distortion relative to the diameter of the standard circle is largest, $D_{min\_3}$: the length of the minimum diameter of the third measurement cross section where the amount of distortion relative to the diameter of the standard circle is smallest, $r_1$: a distance from a center of the well to the first measurement cross section, $r_2$: a distance from the center of the well to the second measurement cross section, $r_3$: a distance from the center of the well to the third measurement cross section, $\theta_{swc\_1}$, $\theta_{swc\_2}$, $\theta_{swc\_3}$: an angle formed by the standard orientation and the second excavation direction of the side-wall core, $\omega_{max\_1}$: the angle formed by the first excavation direction of the well and the action direction of the maximum stress on the first measurement cross section, $\omega_{max\_2}$: the angle formed by the first excavation direction of the well and the action direction of the maximum stress on the second measurement cross section, and $\omega_{max\_3}$: the angle formed by the first excavation direction of the well and the action direction of the maximum stress on the third measurement cross section.

2. The in-situ stress measurement method according to claim 1, wherein a plurality of the side-wall cores are acquired by hollowing out the ground from the inner circumferential surface of the well in the direction different from the first excavation direction of the well, and the first, second, and third measurement cross sections are set in the plurality of side-wall cores.

3. The in-situ stress measurement method according to claim 2, wherein angles formed by a direction where the ground has been hollowed while acquiring each side-wall core relative to the standard orientation of the well are different from each other in the plurality of side-wall cores.

\* \* \* \* \*